(No Model.) 3 Sheets—Sheet 3.
W. A. SHAW.
TELEGRAPH INSTRUMENT.
No. 250,292. Patented Nov. 29, 1881.
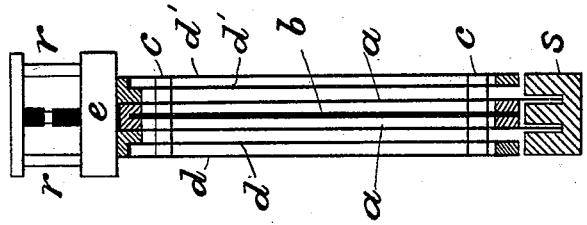
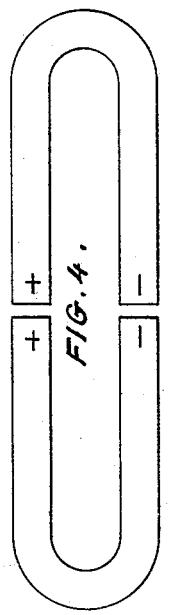
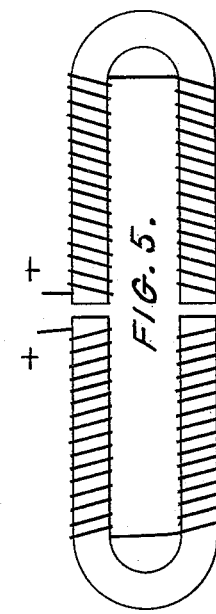
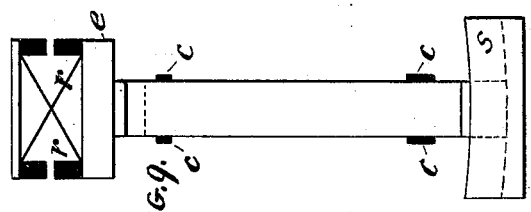
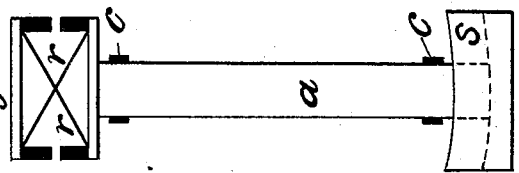
WITNESSES. INVENTOR.

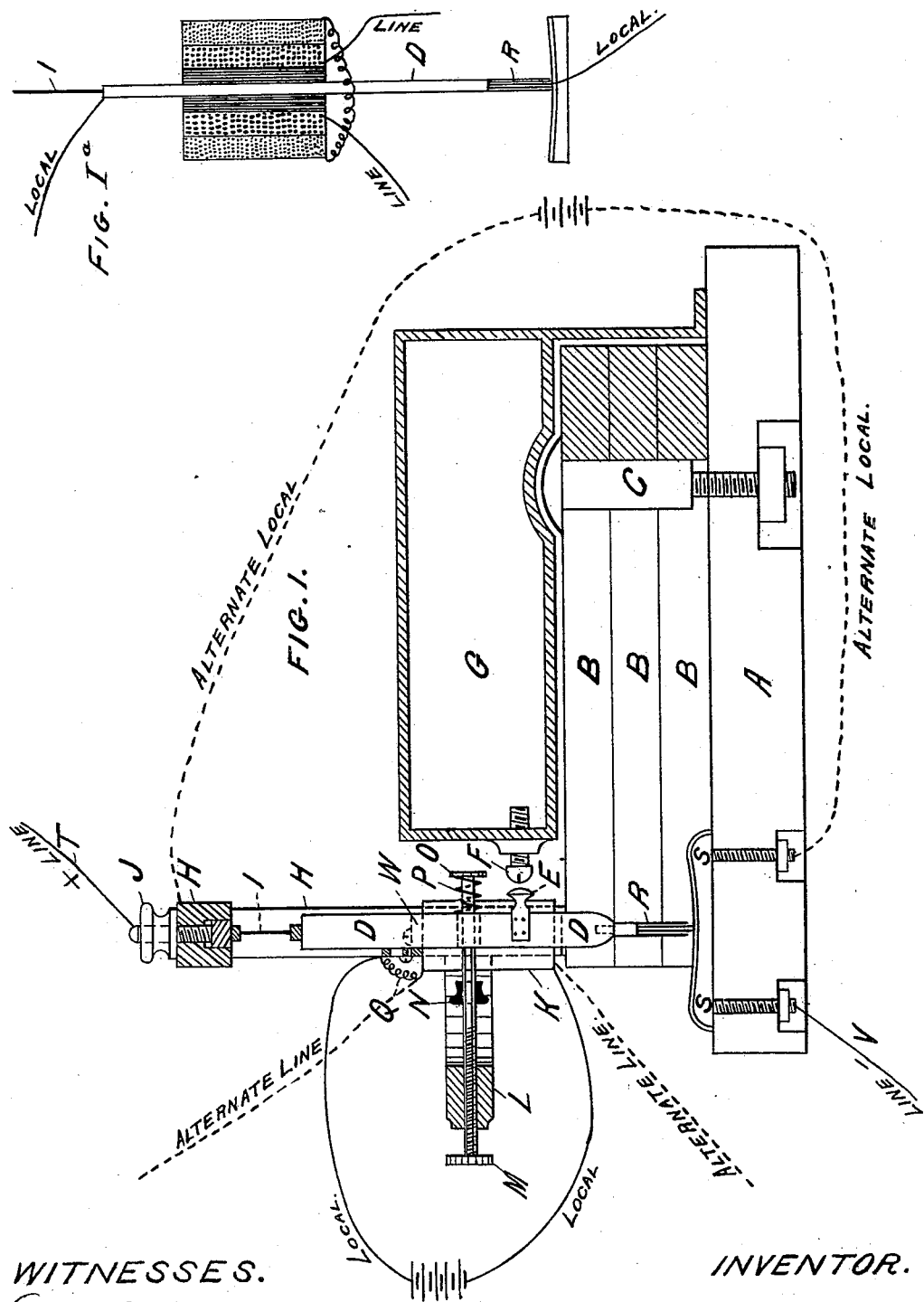

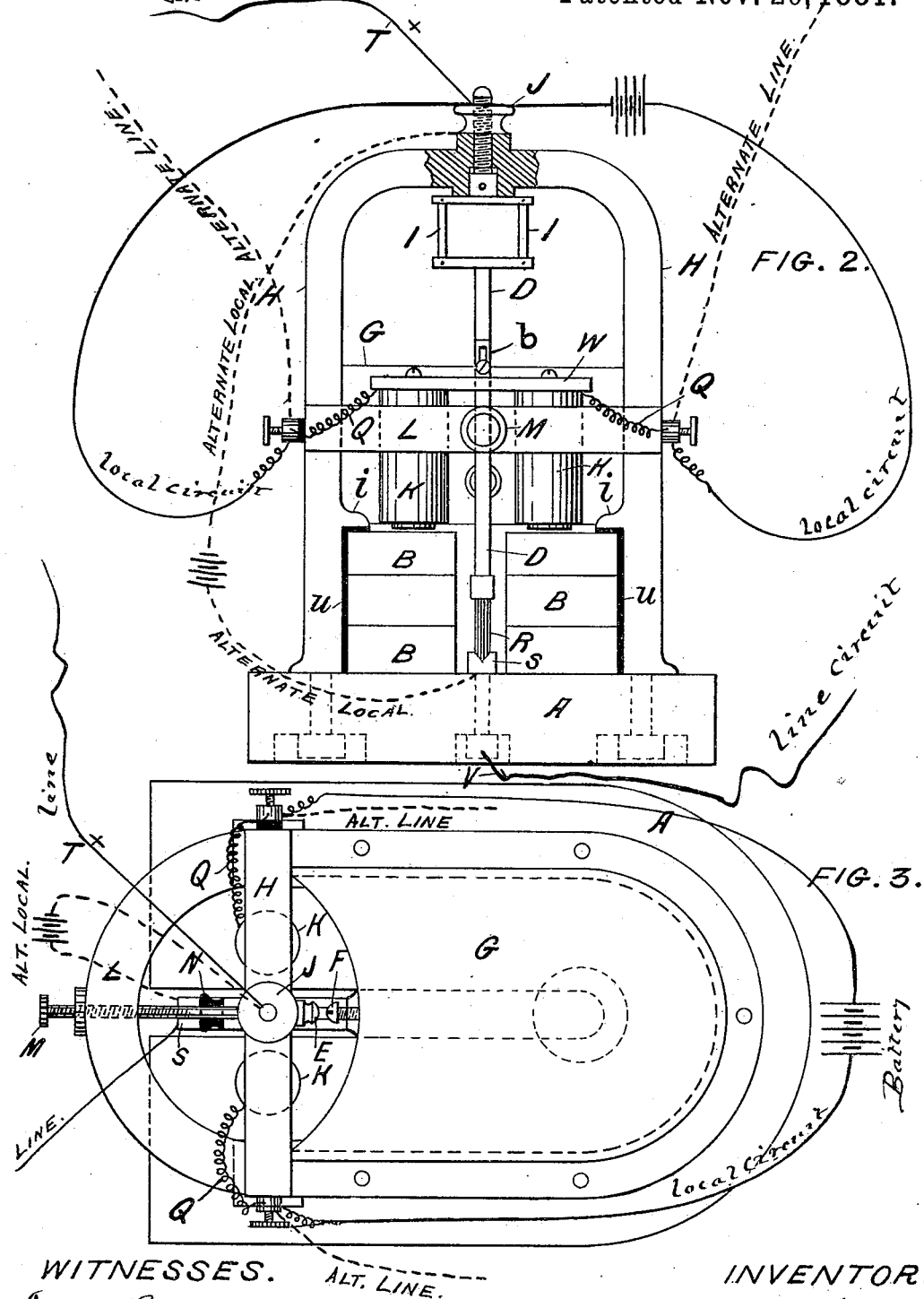

UNITED STATES PATENT OFFICE.

WILLIAM A. SHAW, OF BROOKLYN, NEW YORK.

TELEGRAPH-INSTRUMENT.

SPECIFICATION forming part of Letters Patent No. 250,292, dated November 29, 1881.

Application filed January 11, 1881. (No model.)

*To all whom it may concern:*

Be it known that I, WILLIAM ANTHONY SHAW, of Brooklyn, in the county of Kings and State of New York, have invented a new and useful Telegraph-Instrument, of which the following is a description, in such full, clear, and exact terms as to enable any one skilled in the arts to which it appertains or with which it is most nearly connected to make and use the same, reference being had to the accompanying drawings, making part of this specification, and to the figures and letters of reference marked thereon.

There are three sheets of drawings, illustrating the several parts and combination of parts, principles, and mode of operation composing the invention and controlling its action and practical applications to the several uses and purposes for which it is designed and to which it is applicable.

Figure 1 of the drawings shows a longitudinal vertical section, Fig. 2 a front elevation, and Fig. 3 a plan, of my instrument without the local circuits or relay. Figs. 4, 5, 6, 7, 8, and 9 show detail parts that enter into the construction and organization of the instrument, or that may be substituted for one or more of the parts composing it, and to be hereinafter more fully described.

My invention consists of a telegraph-instrument composed of stationary magnets B B B, combined with a conductor having a vibrating section, D, that is detached and swings freely in the main circuit and in the field of the magnet without breaking the circuit, and which is combined with a sounding device and operated by the action and reaction of a make-and-break current through said vibrating section in the field of the magnets; and said invention consists, also, of an electro-magnet, K, combined electrically with said vibrating conductor and with a local circuit, for the purpose of intensifying and quickening the motion of the sounding device.

The foregoing features, parts, and combinations of parts of my said invention are illustrated by the accompanying drawings, of which the following is a detailed description, reference being had to Figs. 1, 2, and 3.

By A is shown the base-piece of the instrument, and by B B B are shown three U-shaped permanent magnets, held together and upon the base-piece by bolt C.

By S is shown a fixed conductor, made of any good conducting metal and set in the field of the magnets upon the base-piece, to which it is screwed.

By H H is shown a yoke-shaped frame, set vertically over the magnets and made to embrace them near their polar ends, the yoke being insulated from the magnets by vulcanite or otherwise, in the manner shown by U in the drawings. This yoke is bolted to the base-piece in the manner shown, and is fitted with lugs $i$, to catch upon the ends of the magnets and draw them down upon the base-piece, as shown.

By D is shown an operating conductor, suspended in the yoke by springs or a joint at I, and making contact with the fixed conductor S through a platinum brush, R, forming the lower extremity of the conductor.

By L is shown a bow, fixed to or made part of the yoke H, to carry an adjusting-screw, M, that reaches back through the operating conductor or pendulum D, and terminating in a button, $o$, between which and the pendulum a small spiral spring, P, is placed on the screw. This adjusting-screw M also carries an adjustment, N, on the opposite side of the operating-conductor, by which is regulated the amount of the conductor's motion.

By K are shown two electro-magnets, suspended from a cross-head, W, carried by the pendulum or operating-conductor D, the cross-head being united to the pendulum by an adjustable connection, as at $b$, by which the lower ends of the magnets or induction-coils are brought to the right distance from the poles of the magnet. These electro-magnets are made and electrically connected the same in all respects as ordinary electro-magnets. No special description of them is necessary. The drawings merely indicate the circuit to and from them, the detail of their construction and the battery by which they are energized being understood, of course.

By Q Q are shown binding-posts and connecting-wires, by which the circuit is made with these magnets, which, it will be understood, swing or travel with the conductor D, so that in case they are in connection with the binding-post the wires must be long enough to admit of their free motion with the pendulum.

By E is shown a sounding-hammer and the pendulum; by F, a sounding-anvil; and by G, a sounding-box, by which the operation of the instrument is noted.

The operation of the instrument, as far as described, and illustrated by Figs. 1, 2, and 3 of the drawings, is as follows: Assuming the vibrating section D to be in the main circuit, and the instrument to be operated by making and breaking that circuit with an ordinary key, the positive and negative poles of the circuit being represented by the plus and minus signs, and being arranged with reference to the poles of the magnet, as represented, upon closing the circuit the pendulum will be thrown forward against the sounder by the action and reaction of the current in the magnetic field, and back by its own gravity and the reaction of the spring P, the force moving the instrument in this instance being the circuit through the pendulum only. Now let the circuit through the electro-magnets K be closed; then, by making and breaking the current through the pendulum, the energy of the instrument will be increased by the added electrical force in and upon the pendulum, and also by the attractive force of the magnets upon the electro-magnets. Now let the circuit through the pendulum be broken, and let the electro-magnets be placed in the main circuit, and the instrument will then be operated by that circuit alone acting and reacting upon the magnetic field. Now let the circuit through the pendulum be made a closed local circuit; then, by making and breaking through the main circuit, in which, in this case, the electro-magnets are placed, the action of the instrument will be quickened and intensified by the added force of the local circuit, as before.

The line and local circuits are duly marked upon the drawings, and the alternate line and local circuits are shown by dotted lines, and are also duly marked, as will be readily understood.

In the several modes of operation above described the pendulum or operating-conductor is moved in one direction by the action and reaction of a current, and in the opposite direction by the action or reaction of its own gravity and a spring; but it may be operated (and this is a part of my purpose) by changing the polarity of the circuits by means of a key adapted to that end, but not shown in the drawings or making a part of this application.

By Figs. 1, 2, and 3 of the drawings there are shown three permanent magnets piled one on the other; but neither this arrangement nor number of magnets is necessary to the successful operation of the instrument. The same, though perhaps not so good, a result may be obtained with one magnet, or the magnets may be set up on their edges side by side, or stood on their poles, or they may be arranged as shown by Fig. 4 of the drawings; or, instead of permanent magnets, electro-magnets may be used, as shown by Fig. 5 of the drawings; but in all cases the respective magnets should have the same polarity—that is, south pole to south pole and north pole to north pole, as shown by Figs. 5 and 6 of the drawings.

The object of arranging the permanent magnets as shown by Fig. 5 of the drawings is to preserve their magnetism and consequently the energy of the magnetic field.

By Figs. 1, 2, and 3 of the drawings the pendulum or operating-conductor is represented by a single piece of metal, the lower end of which is fitted with a platinum brush to make connection with the fixed conductor S, the upper end being attached to the yoke by two slender springs, the same precisely as those used in suspending clock-pendulums, and arranged in the same way; but it is my intention to use pendulums or an operating-conductor made substantially like those shown by Figs. 7, 8, 9, and 10 of the drawings.

The pendulum shown by Figs. 7 and 8 of the drawings is composed of a series of strips or rods of metal, $a\ a\ a\ a$, united near their top and bottom ends by cross-pieces, $c\ c$. The bars $a$ are arranged side by side, and their lower ends are made to travel in narrow grooves cut in the fixed conductor S, as shown by Fig. 8, their top or opposite ends being fixed in a common head, $e$, to which the suspending-springs $r$ are attached, and in this case crossed, also, as in the case of clock-pendulums.

The principal object of making the operating-conductor in this way is to obtain a stronger electrical-moving contact between the pendulum and the fixed conductor.

By Figs. 9 and 10 of the drawings are shown a front and side view of a compound pendulum or operating-conductor, consisting, first, of two primary conductors, $a\ a$, made of insulated ribbons of metal, the top ends of which are connected to a cross-head, $e$, and the bottom ends of which are stripped of their insulating-covering and made to enter and travel in narrow grooves in the fixed conductor S. Between these two conductors there is arranged a soft iron core, $b$, and on each side of the aforesaid conductors there are arranged two secondary insulated bars, $d\ d$, connected to the head $e$ and to each other by cross-connecting pieces $c\ c$. In making this compound pendulum the primary conductors should be about double the thickness of the secondary bars, the number of which may be increased, if desired, to augment the electrical intensity of the operating conductor or pendulum. If in the construction and operation of this instrument an induction-coil be substituted for the electro-magnet, and having its primary and secondary terminals electrically connected in the usual way to continue the circuit, the action of the pendulum will be intensified the same precisely as in the case of the electro-magnet, the only difference in the action of the pendulum being this—that in the case of the magnet its polarized core will be attracted by the stationary magnet, causing the pendulum to act with the added energy due to that attraction, a force that would not be present in the case of an induction-coil unless such induction-coil had a soft-iron center, in which case the same principle would be presented in the core of the coil as obtained in the core of the magnet. Such an induction-coil is illustrated in Fig. 1ª of the drawings, the primary coil being connected to the line, the local circuit passing through the pendulum and the ends of the secondary coil being connected to each other to form a close circuit, or the line may go through the pendulum and the local be connected to the ends of the coil, as will be readily understood. In so far, then, as the action of the sounder is intensified by the reaction of one current or circuit upon another, the induction-coil is the exact substitute of the magnet, and in so far, also, as the action of the sounder is intensified by the attraction of the stationary magnet for the core of the swinging magnet, the swinging induction-coil having a soft-iron core is the exact substitute for the swinging magnet. It will be understood, therefore, that in so far as my claim extends to and embraces the combination of the electro-magnet with the vibrating section, it also extends to and embraces the combination of the induction-coil with said section, in so far as such induction-coil is substantially the substitute of such magnet in this relation.

Having thus described my invention, I claim—

1. In the circuit of a telegraph-instrument, the combination of a vibrating conductor and an intensifying induction apparatus carried thereby with a fixed magnet, substantially as described, for the purpose specified.

2. In the circuit of a telegraph-instrument, a vibrating section, D, of the conductor, combined with a field-magnet, B, and an electro-magnet, K, or its substitute, carried by said vibrating section, substantially as described, for the purpose specified.

3. In the circuit of a telegraph-instrument, the combination of a vibrating conductor and an intensifying inductive apparatus carried thereby, said vibrating conductor being operated by the united action of a main and local circuit upon said conductor and intensifying apparatus, substantially as described.

4. In the circuit of a telegraph-instrument, a vibrating diomagnetic section, D, in the conductor, operating in the field of a fixed magnet, B, and combined with a pair of sounding devices, E F, substantially as described, for the purpose specified.

5. A telegraph-instrument consisting substantially of the following parts in combination, viz.: a fixed magnet, B, a vibrating conductor, D, an electro-magnet, K, or its substitute, and a pair of sounding devices, E F, the several parts coacting substantially as described.

6. In a telegraph instrument, the combination of a compound pendulous conductor, $a\ d\ c\ e$, in the main circuit, with a fixed conductor, S, in the field of a magnet, B, substantially as described, for the purpose specified.

WM. ANTHONY SHAW.

Witnesses:
WM. H. BROADNAX,
CHAS. C. BUEL.